United States Patent
Itin et al.

[15] 3,650,583
[45] Mar. 21, 1972

[54] ANTIFRICTION THRUST BEARING OF A ROTARY TABLE

[72] Inventors: Artur Markovich Itin, ulitsa Gertsena 9/2, kv. 35; Jury Mikhailovich Zhed, Leninsky prospekt, 85 kv. 13; Vladimir Lvovich Nazarov, 5 Verkhne-Mikhailovsky proezd, 32, kv. 29, all of Moscow, U.S.S.R.

[22] Filed: Nov. 24, 1970

[21] Appl. No.: 92,384

[52] U.S. Cl. .................................................308/230
[51] Int. Cl. ...............................................F16c 19/10
[58] Field of Search ............................308/230, 231, 233

[56] References Cited

UNITED STATES PATENTS 3,030,158  4/1962  Pohler ...............................308/230

Primary Examiner—Edgar W. Geoghegan
Assistant Examiner—Frank Susko
Attorney—Holman & Stern

[57] ABSTRACT

An antifriction thrust bearing for a rotary table is constituted by a double-row bearing having an intermediate race rigidly connected through dimensioned inserts with a portion of the rotary table which is uppermost when in the working position, while the outer or upper and lower races are mounted on the lathe pillar relative to which the table rotates, with the upper race being capable of an axial displacement in a direction towards the lower race.

The invention can be most effectively used in vertical multi-spindle lathes.

1 Claims, 2 Drawing Figures

Patented March 21, 1972 3,650,583

ANTIFRICTION THRUST BEARING OF A ROTARY TABLE

BACKGROUND OF THE INVENTION

The present invention relates to vertical multispindle lathes and, more particularly, to antifriction thrust bearings for rotary tables.

It has been known to use antifriction thrust bearings for rotary tables mounted with their centrally disposed conical opening on the tapered portion of the pillar of a vertical multispindle lathe with a possibility of adjusting the gap between the mated conical surfaces. The known antifriction bearings are defined as single-row bearings and are arranged in the lower portion of the table so that the upper race contacts the thrust face of the table while the lower race is screwed or threaded to the pillar. The gap between the mated conical surfaces of the table and pillar is adjusted by means of the screw joint.

The arrangement of the bearing in the lower portion of the table causes difficulties in adjusting the gap between the conical surfaces of the table and pillar by means of a screw joint, as well as increased radial dimensions and weight of the lathe. This is due to the fact that the elements of the screw joint are surrounded by the principal units of the lathe such as the spindle drive, table rotation drive, etc.

The use of a single-row bearing as a rolling contact bearing provides, for the rotary table, stability in the direction of its gravity alone, which may cause variations in the position of the rotary table under the effect of forces generated by the spindle drive in the course of the lathe operation.

As is known, the screw joint cannot provide an accurate and stable positioning, as well as rigidity, of the system rotary table-pillar.

It is an object of the present invention to eliminate the above-listed disadvantages of the known bearings.

The invention is aimed at the solution of a technical problem of developing an antifriction thrust bearing for a rotary table which provides for a high accuracy of positioning of the rotary table on the pillar, as well as rigidity of the system and convenience in adjusting the gap between the mated conical surfaces of the table and pillar.

SUMMARY OF THE INVENTION

The problem of the invention is solved by the provision of an antifriction thrust bearing for a rotary table which, according to the invention, is made as a double row bearing having an intermediate race rigidly connected to a portion of the rotary table which is the uppermost one when in the working position through adjusting shims thus presetting the value of the gap between the mated conical surfaces of the table and the lathe pillar while the outer or upper and lower races of the bearing are mounted on the pillar with a possibility of the upper race being displaced in an axial direction towards the lower race for developing tightness in the bearing.

Such a structural arrangement of the rotary table thrust bearing helps provide for a high accuracy of positioning the rotary table on the pillar, convenient adjustment of the gap between their mated conical surfaces and rigidity of the system.

In addition, the present bearing makes for reducing the radial dimensions and weight of the lathe.

The present invention will be more apparent upon considering the following detailed description of an exemplary embodiment thereof, reference being had to the accompanying drawings, in which:

DETAILED DESCRIPTION OF THE INVENTION

Figure 1:
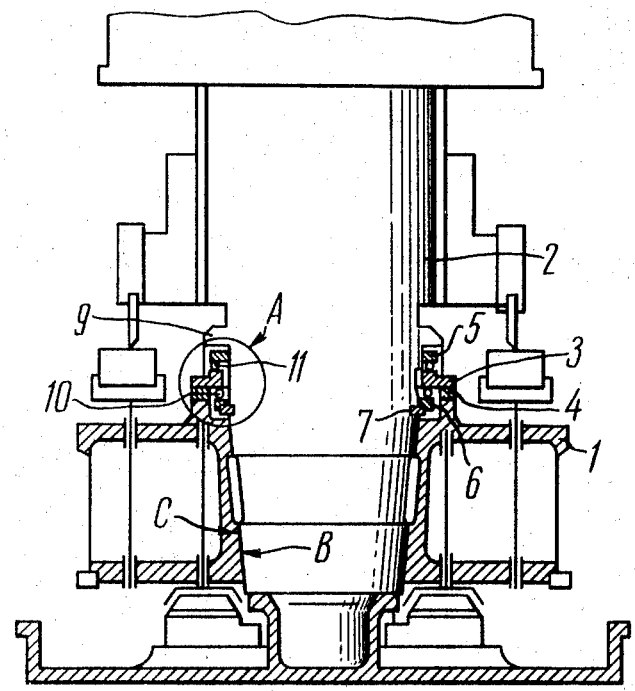
FIG. 1 shows diagrammatically partly in elevation and partly in section a vertical multispindle lathe employing an antifriction thrust bearing according to the present invention.
Figure 2:
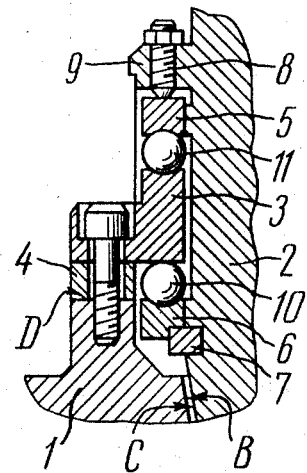
FIG. 2 illustrates in section and on an enlarged scale the circled area A of FIG. 1.

The present antifriction thrust bearing for a rotary table 1 (FIG. 1) mounted with its centrally disposed conical opening on a tapered portion of a pillar 2 of a vertical multispindle lathe with a possibility of adjusting the gap between mated conical surfaces B and C is constituted, according to the present invention, as a double-row bearing. Its intermediate race 3 (FIG. 2) is rigidly connected with uppermost (when in the working position) portion D of the rotary table 1 through the intermediary of adjusting shims 4 presetting the value of the gap between the mated conical surfaces B and C of the table and pillar, respectively. Outer or upper and lower races 5 and 6 of the bearing are mounted on the pillar with a possibility of the upper 5 race being displaced in an axial direction towards the lower race 6 which lower race rests against a lower flange 7 of the pillar 2 for developing tightness in the bearing.

When affected by pressure elements such as screws 8 mounted in an upper flange 9 of the pillar 2, the intermediate race 3 of the bearing cooperates, via balls 10, with the lower race 6 and, via balls 11, with the upper race 5.

In the course of the lathe operation, the rotary table 1 is acted upon by time and space-varying forces and moments of forces of cutting, of the spindle drive, and the table's own gravity.

The vertical component of said forces and moments of forces, directed downwardly (in the working position of the lathe), is taken up by the flange 7 of the pillar through the lower race 6, balls 10, intermediate race 3 and the adjusting shims 4.

The vertical component of said forces and moments of forces, directed upwardly (in the working position of the lathe), is taken up by the upper flange 9 of the pillar 2 through the pressure elements the upper race 5, balls 11, the intermediate race 3 and the adjusting shims 4.

The adjustment of the gap between the mated conical surfaces B and C is effected through the choice of the adjusting shims 4 to be placed on the upper portion D of the rotary table. By reducing the adjusting shims 4, there is caused a corresponding reduction of the gap.

The rigidity of the system is provided for by displacing the upper race 5 under the effect of the screws 8 in an axial direction towards the lower race resting against the lower flange 7 of the pillar 2. This helps develop interference in the balls 10 and 11, the intermediate race 3 and the lower race 6.

The arrangement of the thrust bearing in the upper portion of the rotary table assisted in reducing the distance from the drives of the spindles and table rotation to the pillar 2 and, thereby, reduce the radial dimensions and weight of the lathe, as well as provide an easy access to the bearing for adjusting the gap between the mated conical surfaces of the table and pillar and developing the desired tightness in the bearing.

Such a structural embodiment of the present thrust bearing and the arrangement thereof make for a high accuracy of positioning the rotary table on the pillar, rigidity of the system and convenience in adjusting the gap between the mated conical surfaces of the table and pillar.

What is claimed is:

1. An antifriction thrust bearing for a rotary table mounted with its centrally disposed conical opening on a tapered portion of a pillar of a vertical multispindle lathe to allow adjustment of the gap between their mated conical surfaces, said bearing being defined as a double-row bearing and comprising: upper, intermediate and lower races; rolling bodies arranged between the upper and intermediate races and the intermediate and lower races; shims insertable between the intermediate races and a portion of the rotary table which is uppermost when in the working position serving to preset the value of the gap between said mated conical surfaces of said table and pillar; said upper and lower races, when in the working position, being mounted on said pillar to permit the upper race to move in an axial direction towards the lower race for developing tightness in the bearing; and said intermediate race being connected rigidly to the uppermost portion of said rotary table through said insertable shims.

* * * * *